June 21, 1949.   S. ROBSON   2,473,611
PROCESS FOR THE PRODUCTION OF ZINC
Filed June 5, 1947

Inventor
Stanley Robson

Patented June 21, 1949

2,473,611

UNITED STATES PATENT OFFICE 2,473,611

PROCESS FOR THE PRODUCTION OF ZINC

Stanley Robson, Redland, Bristol, England, assignor to The National Smelting Company Limited, London, England, a British company Application June 5, 1947, Serial No. 752,668
In Great Britain June 5, 1946

3 Claims. (Cl. 75—86)

This invention relates to the production of metallic zinc from roasted ores, slags and/or other materials containing zinc.

A process already in successful operation for the recovery of zinc from slags containing zinc oxide comprises injecting pulverized coal with an air blast into a bath of molten slag; the primary reaction produces carbon monoxide with a little carbon dioxide; the CO reacts with the zinc oxide liberating zinc and forming more $CO_2$. The remaining CO and zinc are then completely burnt by excess air, producing zinc oxide and further $CO_2$. The zinc oxide and gases thus produced are then cooled by passing them through a steam generator, and the oxide is collected. The process is essentially a "batch" as distinguished from a continuous process. Molten slag, together with the shell from the charging pots, is charged into the furnace, and after a period of operation the spent slag is discharged. Existing plants for operating this process handle slag from lead blast furnaces containing about 16% zinc and 2% lead. The zinc recovery obtained is of the order of 95%. The charge is mainly molten slag; this can be partly replaced by granulated slag, if necessary, but only at the cost of increased fuel consumption.

The above mentioned process leads to the separation of zinc as zinc oxide. My object is the recovery of metallic zinc instead of the oxide and the possibility of using the slagging furnace for this purpose has been very thoroughly studied by me.

I have found that by no adaptation of the known process in which an air blast is used can a useful yield of metallic zinc be obtained, since in order to maintain the temperature of the slag bath an amount of air must be used substantially exceeding that required to burn the carbon to carbon monoxide; much $CO_2$ is therefore formed which, as the gases cool, and particularly in the process of condensation, re-oxidises most of the released metallic zinc vapour to zinc oxide, by reversal of the reduction reaction

$$ZnO+CO \rightarrow Zn+CO_2 \qquad (1)$$

The need for excess air, if the bath temperature is to be maintained, arises from the dilution of the oxygen of the air blast by the inert nitrogen content of the air itself, which absorbs a large proportion of the heat generated.

I have found that by using oxygen or an oxygen-rich gas mixture instead of air, the total oxygen content of the blast relative to the total carbon content of the fuel supplied can be reduced to such an extent that $CO_2$ is not formed in any appreciable quantity, without decreasing the rate of evolution of heat to a point at which it ceases to balance the heat losses and the slag ceases to be fluid; and that with progressive enrichment of the blast gas in oxygen the total amount of oxygen needed to keep the process going can be progressively decreased below that required for complete combustion of the carbon to CO. The zinc oxide in the slag is then reduced either directly by the excess carbon in accordance with the reaction:

$$ZnO+C \rightarrow Zn+CO \qquad (2)$$

or partly by this reaction (2) and partly by the CO in accordance with reaction (1), the $CO_2$ thereby produced being reduced by the excess carbon thus:

$$CO_2+C \rightarrow 2CO \qquad (3)$$

The resultant effect of operating with an excess of carbon over the amount which can just be burnt to CO by the oxygen in the blast is to inhibit the production of $CO_2$, and the greater the excess of carbon the more successfully is the production of $CO_2$ inhibited. By minimising the evolution of $CO_2$, the extent to which the reverse of reaction (1) can occur during cooling is also minimised. It thus becomes possible to obtain a good yield of metallic zinc on condensation.

In the process according to my invention, a blast of gas containing not less than 40% by volume of oxygen, the remainder being substantially free from $CO_2$ and composed principally of inert gas such as nitrogen, together with carbonaceous fuel in a finely divided state in suspension in the blast gas, is blown into a bath of molten zinciferous slag which may include other materials containing zinc oxide or/and additional carbon, the molecular proportion of carbon to oxygen in the blast being greater than two, so that carbon is always present in sufficient excess in relation to the oxygen supply to preclude the formation of any substantial quantity of $CO_2$.

By this process metallic zinc vapour is evolved mixed with a gas containing a high proportion of carbon monoxide to carbon dioxide; this mixture can be collected with exclusion of air, and from it the zinc vapour can be condensed as molten metal in a suitable condenser.

The efficiencies both of liberation of zinc and of the condensation of the zinc vapour fall off rapidly with increasing dilution of the oxygen content of the blast gas, the minimum oxygen concentration in the blast gas with which the process can be worked being about 40% as above stated; and the blast gas should not contain any large amount of water vapour. I prefer to work with a blast gas consisting of oxygen of 98% purity, but if a lower oxygen concentration in the blast is to be used, dry, oxygen-enriched air is suitable.

The effectiveness of the process depends on avoiding undue dilution, not only of the oxygen in the blast gas, but also of the zinc vapour in the evolved gases, with inert and heat absorbing gases or vapours and hence it is desirable that, in addition to the use of a high oxygen concentration in the blast, the fuel should be dry and have a low hydrogen content; both hydrogen and water vapour constitute useless diluents which absorb heat by reason of their thermal capacities, and also because, in the case of water vapour, heat is absorbed endothermically in the reaction with carbon.

For this reason suitable fuels for the process of this invention include anthracite and artificially carbonized fuels.

On the other hand when working with a blast consisting of substantially pure oxygen (98% purity or over) some dilution of the products of combustion can be tolerated. It is therefore possible when operating with a substantially pure oxygen blast to use liquid hydrocarbon fuels of the heavier types in which the proportion of carbon to hydrogen is high. Such fuels may well be useful because of the ease of atomising them in the blast.

An instance of the application of the invention is to the production of zinc metal from roasted zinc blende. The furnace comprises essentially a tank provided with tuyères below the level to which it is to be filled with slag and preferably near the bottom. A tap-hole or the like at the level at which the slag is to be run off and a charging device by which solid materials can be introduced without admitting any large amount of air are also provided. For the removal of the zinc vapour and gases there is an outlet in the upper part of the tank leading to a condenser.

To start the operation, the tank is first partially filled with a charge of granulated material of composition similar to that of the liquid slag which will be maintained in the bath during the subsequent operations. Pulverised fuel, with oxygen-rich gas, is blown in through the tuyères. When a pool of molten slag has been produced, steady operation commences. The charge may consist of a roasted ore, preferably free from dust; or a zinciferous slag, e. g. from a lead blast furnace; alternatively an ore that has been roasted and briquetted may be used; the charge may also consist of a mixture of oxidised ore and carbonaceous fuel in the form of briquettes. Fresh charge material which may be hot or cold, but preferably heated to 800° C. or over, is added either continuously or at short intervals. Slag-producing materials such as silica or/and lime over and above such as are present in the ore and in the pulverised fuel may be added as required. The furnace becomes filled with slag containing such proportion of zinc as may permit of high rate of through-put with an economic elimination. Zinc vapour is evolved and is conducted to the condenser. The process works continuously.

In the event of the roasted ore being briquetted with carbonaceous material, the reaction between the oxygen and carbon in the blast serves only to generate heat, supplying the requirements of the reaction between the zinc oxide and carbon in the briquettes in accordance with reaction (2). The briquettes should be formed so that they slag and disperse as the zinc is eliminated.

In the process for recovering zinc as metal, as already described, the whole slag bath will be maintained at constant composition, the zinc content being high enough to allow rapid removal of the zinc but low enough to avoid excessive loss by carrying over zinc oxide with the spent slag.

Instead of the furnace having a single chamber in which the whole of the slag is contained and can become thoroughly mixed, it may be constructed so that the slag flows either through a labyrinth or through a succession of chambers arranged so that the zinc content falls off as the slag flows from the charging point to the tapping point. This may enable the rate of removal of the zinc from the slag to be increased and the zinc oxide content of the outflowing spent slag to be lowered.

In certain circumstances the maximum of elimination of zinc as metal may not be economical, in which case the extraction of zinc as metal may be limited, leaving some zinc oxide in the spent slag drawn off from the bath, which may then be treated for extraction of zinc as oxide, e. g. by a known process of the kind previously mentioned.

If the charge materials contain any appreciable amount of copper, silver or other like metals, it may be convenient to add a sulphur containing material such as iron-sulphide to the charge which will give rise to formation of a matte containing the copper etc. which will sink to the bottom of the bath and can be drawn off through a second tap-hole at the bottom of the bath, which must in any case be provided for cleaning purposes and the like. This second tap hole will also enable any molten iron that may be formed to be drawn off.

It is found that the gases as they leave the slag bath are relatively hot, and that their sensible heat can be utilised for effecting further reduction of zinc from unslagged material. Thus it is sometimes convenient to pass the zinc-containing gases as they leave the bath and before they enter the condenser, through a heated column of briquettes containing roasted ore and carbon, whereby some zinc is liberated by reaction (2) at the expense of a drop in temperature of the gases. This column also has some beneficial effect in filtering out droplets of slag entrained in the gas.

Alternatively the gases, before they enter the condenser, may be passed through a column of coke. This helps to filter out droplets of slag and also serves to reduce at least partially any $CO_2$ that may be formed by reaction (3), notwithstanding the excess of carbon in the blast. To effect any considerable amount of carbon dioxide removal it will usually be necessary to heat the coke otherwise than by the gases, for instance by means of an electric current, using the coke as a resistor.

The accompanying drawings illustrate a typical example of a suitable furnace for carrying out the process of the invention. In these drawings.

Figure 1:
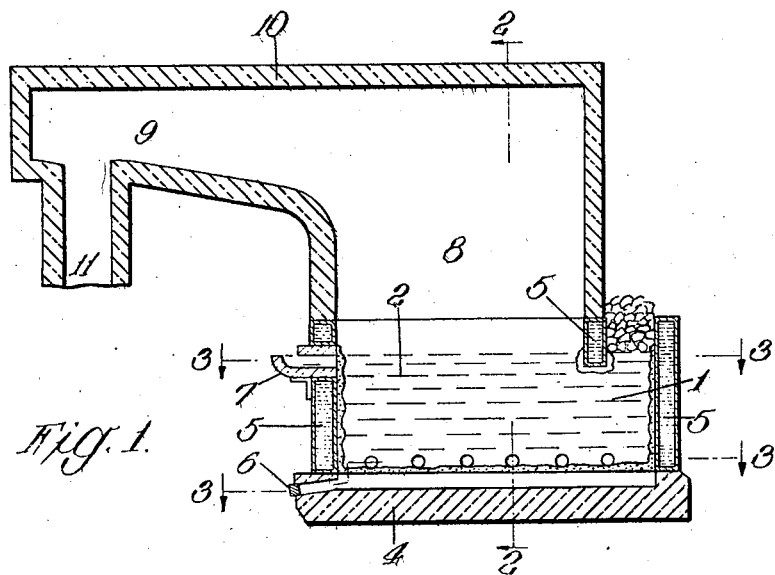
Fig. 1 is a sectional elevation of the furnace along its longitudinal centre line.
Figures 2, 3:
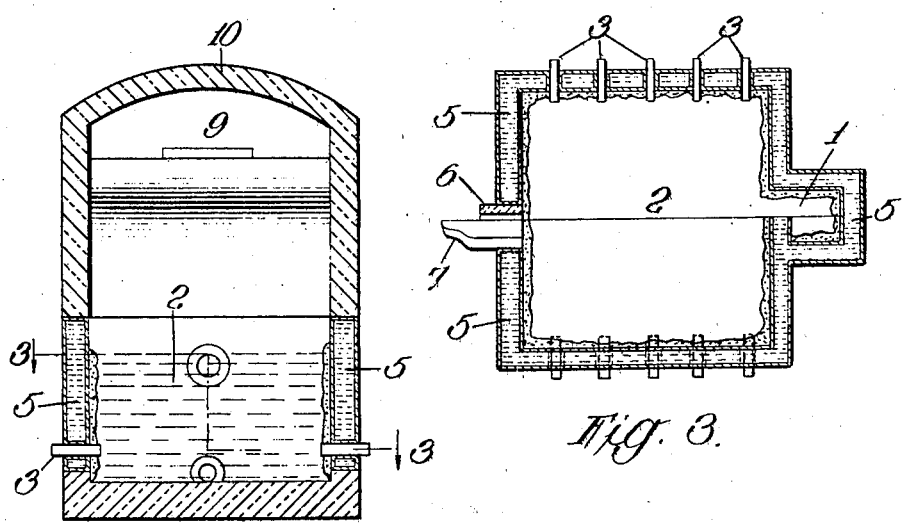
Fig. 2 is a sectional elevation on the line 2—2 of Fig. 1.
Fig. 3 is a sectional plan view on the line(s) 3—3 of Fig. 1 and Fig. 2.

In the furnace illustrated a tank for holding a pool 2 of molten slag has a solid, refractory, slag-resistant bottom 4, made e. g. of ceramic or carbonaceous material, such as sintered alumina, graphite or carborundum, and hollow water-cooled walls 5, the lower parts of which accommodate tuyères 3. The tank includes a charging bay 1, and the gas-collector space 8 in the furnace above the surface level of the slag bath 2 is sealed off from the opening of the charging bay by a part of the wall 5 which dips below the surface level of the bath. The walls of the gas collector space 8 are of solid refractory material and are continuous with an arched crown 10. An extension of the gas-collector space forms a flue 9 with a sloping floor ensuring that the slag carried forward as spray and deposited in the flue runs back into the tank; and a downcomer 11 leads from the flue 9 into the condenser (not shown). The level of the slag bath is kept constant by a continuous run-off opening provided with a spout 7, and a plugged tap-hole 6 at the bottom of the tank enables any molten iron or matte that is formed to be drawn-off when required, and provides for complete emptying of the tank, when necessary.

I claim:

1. A process for the production of metallic zinc from roasted ores, slags and other zinciferous materials which comprises reducing the zinciferous material at an elevated temperature sufficient to produce metallic zinc vapor in a non-oxidizing gaseous atmosphere substantially free from carbon dioxide by blowing into a molten slag bath of the zinciferous material a blast of carbonaceous fuel suspended in an oxygen-containing gas comprising not less than 40% by volume of oxygen and the balance essentially inert gas substantially free from carbon dioxide, the molecular proportion of carbon to oxygen in the blast being greater than two so that carbon is always present in sufficient excess in relation to the oxygen supply in said blast to preclude the existence in the zinc vapor-containing atmosphere of any substantial quantity of carbon dioxide, and condensing the resulting zinc vapor.

2. A process for the production of metallic zinc as set forth in claim 1 which includes maintaining the bath of molten slag at substantially constant composition by additions thereto of fresh charged materials, withdrawing spent slag from the bath at a level below the introduction of the blast gas in amount equivalent to the additions of fresh charged materials, and substantially continuously blowing a blast of carbonaceous fuel suspended in the oxygen-containing gas into the bath of molten slag.

3. A process for the production of metallic zinc as set forth in claim 1 in which the oxygen-containing gas comprises about 98% by volume of oxygen.

STANLEY ROBSON.

REFERENCES CITED

The following references are of record in the file of this patent:

UNITED STATES PATENTS

| Number | Name | Date |
|---|---|---|
| 1,583,933 | Kirby | May 11, 1926 |
| 1,782,418 | Garred | Nov. 25, 1930 |